United States Patent
Pfeiffer

(10) Patent No.: US 8,361,606 B2
(45) Date of Patent: Jan. 29, 2013

(54) COMPOSITE COMPRISING AT LEAST ONE HARD COMPONENT AND AT LEAST ONE SOFT COMPONENT

(75) Inventor: Bernhard Pfeiffer, Wallbach (DE)

(73) Assignee: Ticona GmbH, Kelsterbach (DE)

( * ) Notice: Subject to any disclaimer, the term of this patent is extended or adjusted under 35 U.S.C. 154(b) by 1660 days.

(21) Appl. No.: 11/631,445

(22) PCT Filed: Jun. 28, 2005

(86) PCT No.: PCT/EP2005/006913
§ 371 (c)(1), (2), (4) Date: Jan. 23, 2007

(87) PCT Pub. No.: WO2006/002856
PCT Pub. Date: Jan. 12, 2006

(65) Prior Publication Data
US 2008/0118726 A1    May 22, 2008

(30) Foreign Application Priority Data
Jul. 2, 2004 (DE) .......... 10 2004 032 152

(51) Int. Cl.
*B32B 7/02* (2006.01)
*B32B 3/26* (2006.01)
*B29B 7/00* (2006.01)

(52) U.S. Cl. .............. 428/217; 428/297.4; 428/323; 428/297.1; 264/328.8

(58) Field of Classification Search .............. 264/328.14
See application file for complete search history.

(56) References Cited

U.S. PATENT DOCUMENTS

| | | | |
|---|---|---|---|
| 5,415,906 A | 5/1995 | Miyakawa et al. | |
| 5,736,603 A * | 4/1998 | Pfeiffer et al. | 524/495 |
| 6,240,970 B1 | 6/2001 | Ostrander et al. | |
| 6,263,920 B1 | 7/2001 | Hsich et al. | |
| 6,872,775 B2 | 3/2005 | Greulich et al. | |
| 2004/0191440 A1* | 9/2004 | Funaki et al. | 428/34.6 |
| 2006/0124906 A1* | 6/2006 | Bradley et al. | 252/500 |
| 2008/0029934 A1* | 2/2008 | Ziegler et al. | 264/328.14 |

FOREIGN PATENT DOCUMENTS

| | | |
|---|---|---|
| EP | 1128995 | 9/2001 |
| EP | 1225036 A1 | 7/2002 |
| EP | 1280167 A1 * | 1/2003 |
| WO | WO 0020204 A1 * | 4/2000 |

OTHER PUBLICATIONS

Ketjenbkack EC 300J AkzoNobel Product Data Sheet.*
"PRESEAL TPE 2011," Premix, Jun. 2, 2002, http://www.premixthermoplastics.comproductpdf/compounds/Tds%20TPE%205011.pdf>.

* cited by examiner

*Primary Examiner* — Jennifer Chriss
*Assistant Examiner* — Ricardo E Lopez
(74) *Attorney, Agent, or Firm* — Dority & Manning, P.A.

(57) ABSTRACT

The present invention relates to a plastics composite encompassing at least one hard component whose modulus of elasticity is greater than or equal to 1000 MPa and one soft component whose modulus of elasticity is less than or equal to 500 MPa, where the hard and the soft component have electrical conductivity, and where the bond strength of the composite is at least 0.5 N/mm$^2$.

25 Claims, No Drawings

COMPOSITE COMPRISING AT LEAST ONE HARD COMPONENT AND AT LEAST ONE SOFT COMPONENT

RELATED APPLICATIONS

This application is a national stage application (under 35 U.S.C. 371) of PCT/EP2005/006913 filed Jun. 28, 2005, which claims benefit of German application 10 2004 032 152.3 filed Jul. 2, 2004.

Composite comprising at least one hard component and at least one soft component The present invention relates to composites encompassing at least one hard component and at least one soft component, to processes for their production, and to use.

The increasing use of electrical and electronic equipment in ever-smaller spaces (mobile telephones, motor vehicles, aircraft construction, shipbuilding) demands more use of plastics. Casings and modules composed of metal are increasingly being replaced by plastics components. However, the weight saving and the integration possibilities provided by plastics have to be seen in the light of lack of electromagnetic shielding from high-frequency fields and waves. Plastics cannot prevent ingress of electromagnetic fields and waves into sensitive electronic circuits, or their emission therefrom, i.e. they cannot provide electromagnetic compatibility (EMC).

One way of achieving electromagnetic shielding with plastics consists in applying a metal layer subsequently, i.e. after production of the plastics molding. A disadvantage of this is that it requires an expensive subsequent step which necessitates additional logistics, can generate defects, and mostly exceeds the production costs of the actual plastics molding.

The preferred method consists in rendering the plastic conductive. Plastics comprising conductive fillers (compounded materials) are the only commercially important materials. Intrinsically conductive plastics are not fusible and are insoluble and for this reason cannot be processed by the conventional processing methods for plastics. However, they can serve as conductive additive in finely ground form.

However, if conductive plastics casings are connected to one another the result is relatively poor shielding, discernible in high contact resistance.

Insertion of highly conductive gaskets (mostly using silver as filler) improves shielding. However, this is in most cases not an adequate solution and is also expensive, since the thickness of the gasket has to be of the order of millimeters in order to give the gasket mechanical stability and ease of handling.

In the light of the prior art stated herein, it was an object of the present invention to provide composites which can give high conductivity and therefore can give a high level of electromagnetic shielding.

Another object of the present invention was to provide composites which can be produced at low cost on an industrial scale. The intention here was in particular to use materials that are obtainable at low cost.

Another object of the present invention was to provide composites which have good mechanical properties. The intention here was that these properties be substantially capable of matching to the needs of the application.

The composites set out in claim 1 achieve these and other objects which will be apparent to the person skilled in the art by virtue of the prior art discussed in the introduction.

Accordingly, the present invention provides plastics composites encompassing at least one hard component whose modulus of elasticity is greater than or equal to 1000 MPa and one soft component whose modulus of elasticity is less than or equal to 500 MPa, where the hard and the soft component have electrical conductivity, and where the bond strength of the composite is at least 0.5 N/mm$^2$.

The composites of the present invention have excellent suitability for providing shielding to prevent ingress of electromagnetic fields and waves into sensitive electronic circuits, and their emission therefrom. The mechanical properties of the composites can moreover be matched to the needs of the end user over a wide range.

Furthermore, the composites of the present invention can be produced in a simple manner at low cost, and in particular low-cost materials can be used here. The composites can therefore be produced via fully automatic tooling. This can achieve high and consistent quality.

The composites of the present invention have at least one hard component which encompasses at least one thermoplastically processable plastic. The modulus of elasticity of the hard component is at least 1000 MPa, preferably at least 1500 MPa, and particularly preferably at least 2000 MPa. The modulus of elasticity can be obtained from stress-strain tests to ISO 527, the test velocity generally used being 1 mm/min at 23° C.

The high modulus of elasticity is generally achieved via use of appropriate thermoplastics. Plastics having these properties are known to the person skilled in the art. Among these are polyolefins, in particular polyethylene, polypropylene, or cycloolefin copolymer; polyacetals, in particular polyoxymethylene; polyamide; polyphenylene oxide; polyphenylene sulfide; polyphenylene ether; polyurethane; polycarbonate; polyester, in particular polyethylene terephthalate or polybutylene terephthalate; polystyrene; acrylonitrile-butadiene-styrene copolymers, or acrylonitrile-styrene-acrylate graft polymers; liquid crystal polymers or blends composed of the plastics mentioned. The hard component can particularly preferably comprise polyacetals, and homo- and copolymers can be used here. WO 00/20204 describes these homo- and/or copolymers.

Preferred plastics, where these have high modulus of elasticity, have a number-average molecular weight $\overline{M}_n$ of from 2000 to 400 000, preferably from 10 000 to 200 000, and have a volume flow index (melt volume rate, MVR) of from 0.5 to 200 cm$^3$/10 min, preferably from 1 to 70 cm$^3$/10 min, at 190° C. with an applied load of 2.16 kg to DIN ISO 1133. Number-average molecular weight can be determined via gel permeation chromatography (GPC).

The hard component preferably encompasses from 0.1 to 95% by weight, particularly preferably from 1 to 70% by weight, particularly preferably from 5 to 30% by weight, based on the weight of the hard component, of plastics which have high modulus of elasticity.

The hard component comprises at least one conductive additive, which gives the hard component conductivity. These substances are known to persons skilled in the art. Among them are metals, e.g. iron, steel, copper, brass, nickel, zinc, silver, gold, platinum; carbon, which may also have been metallized, e.g. nickel- or silver-coated carbon; conductive plastics, e.g. polypyrrole, polyaniline, polythiophene, or metallized fillers, such as metallized glass. The conductive fillers can take the form of powder, beads, hollow beads, minerals, or long or small fibers. It is preferable to use powder derived from carbon black, or conductivity black, or graphite, or to use nickel- or silver-coated pulverulent fillers, such as nickel- or silver-coated carbon, nickel- or silver-coated graphite, nickel- or silver-coated glass, or intrinsically conductive polymers, e.g. polypyrrole, polyaniline, polythiophene, or fibers composed of stainless steel, of carbon, or of metallized (nickel-coated) carbon, or to use nickel- or silver-coated beads or hollow beads composed of glass. These substances can be used individually or in the form of a mixture.

It is particularly preferable to use long fibers composed of stainless steel, of carbon, of metallized carbon, of graphite, or of glass, or of nickel- or silver-coated carbon, of nickel- or silver-coated graphite, or of nickel- or silver-coated glass, or to use single-wall or multiwall carbon nanotubes. Short-fiber products here mean granular materials, pellets, and components comprising fibers whose fiber lengths are up to 0.3 μm. Long-fiber products here mean granular materials, pellets, or components comprising fibers whose fiber lengths are above 0.3 μm, in particular fiber lengths of from 0.5 μm to 50 mm, particularly preferably fiber lengths of from 0.5 μm to 10 mm.

In the case of conductive fillers, the efficiency of the filler for conductivity, shielding, and electromagnetic compatibility increases as the filler particles become longer and thinner. For this reason, it is preferable to use long, thin fibers (cf. B. Pfeiffer, Edelstahifasergefüllte Kunststoffe [Plastics filled with stainless steel fibers], Plastverabeiter, Vol. 48, 1997, No. 12).

The hard component preferably encompasses from 0.1 to 95% by weight, particularly preferably from 1 to 70% by weight, particularly preferably from 5 to 30% by weight, of conductive additives, based on the weight of the hard component. The conductivity of the hard component is preferably at least $10^{-7}$ S and in particular is in the range from $10^{-7}$ to $10^4$, particularly preferably in the range from $10^{-3}$ to $10^2$, S/cm, and conductivity can be measured here to DIN EN 0303 Part 30.

The hard component can moreover have well-known additives. Among these are fillers and reinforcing materials, e.g. fibers, in particular glass fibers, carbon fibers, aramid fibers, mineral fibers; processing aids, polymeric lubricants, lubricants with external and/or internal lubricant action, antioxidants, coupling agents, waxes, nucleating agents, mold-release agents, glass beads, mineral fillers, such as chalk, calcium carbonate, wollastonite, silicon dioxide, talc, mica, montmorillonite, organically modified or unmodified, organically modified or unmodified phyllosilicates, materials which form nanocomposites with the liquid-crystalline plastic or with the polyarylene sulfide, or nylon nanocomposites, or a mixture of the abovementioned substances.

The composites of the present invention have at least one soft component, which preferably comprises at least one thermoplastic wholly processable plastic. The modulus of elasticity of the soft component is at most 500 MPa, preferably at most 100 MPa, and particularly preferably at most 50 MPa. The low modulus of elasticity is generally achieved via use of appropriate plastics. Plastics having these properties are known to the person skilled in the art. Among these are in particular straight or modified polyolefin elastomers (TPEO), in particular polypropylene elastomers, such as ethylene-propylene terpolymer/propylene (PP-EPDM), crosslinked ethylene-propylene terpolymer/propylene (PP-XIEPDM), nitrile-butadiene rubber/polypropylene (PP-NBR); crosslinked polyolefin elastomers (TPEV); elastomers based on polyetherester or polyesterester (TPEE), polyether urethane elastomer and/or polyester urethane elastomer (TPEU); polyetheramide elastomer (TPEA), and/or styrene elastomer (TPES), in particular styrene-butadiene-styrene copolymers (SBS), styrene-ethylene-butylene-styrene copolymers (SEBS), styrene-ethylene-propylene-styrene copolymers (SEPS), styrene-isoprene-styrene copolymers (SIS). The thermoplastic elastomers can be used individually or in the form of a mixture.

Preferred plastics, where these have low modulus of elasticity, have a number-average molecular weight $\overline{M}_n$ of from 2000 to 400 000, preferably from 10 000 to 200 000, and have a volume flow index (melt volume rate, MVR) of from 0.5 to 200 $cm^3$/10 min, preferably from 1 to 70 $cm^3$/10 min, at 190° C. with an applied load of 2.16 kg to DIN ISO 1133.

The soft component preferably encompasses from 0.1 to 95% by weight, particularly preferably from 1 to 70% by weight, particularly preferably from 5 to 30% by weight, based on the weight of the soft component, of thermoplastic elastomers.

It is preferable to use at least one thermoplastic elastomer whose Shore hardness is A 90 to D 30, preferably Shore A 40 to A 90. The hardness of the soft component of the composite is preferably in the range from Shore hardness A 90 to D 30, particularly preferably Shore A 40 to A 90.

The soft component likewise encompasses the added materials set out above, these bringing about conductivity. It is particularly preferable to use long fibers composed of stainless steel, of carbon, of metallized carbon, of graphite, or of glass, or of nickel- or silver-coated carbon, of nickel- or silver-coated graphite, or of nickel- or silver-coated glass, or to use single-wall or multiwall carbon nanotubes. Short-fiber products here mean granular materials, pellets, and components comprising fibers whose fiber lengths are up to 0.3 μm. Long-fiber products here mean granular materials, pellets, or components comprising fibers whose fiber lengths are above 0.3 μm, in particular fiber lengths of from 0.5 μm to 50 mm, particularly preferably fiber lengths of from 0.5 μm to 10 mm.

The soft component preferably encompasses from 0.1 to 95% by weight, particularly preferably from 1 to 70% by weight, particularly preferably from 5 to 30% by weight, of conductive additives, based on the weight of the soft component. The conductivity of the soft component is preferably at least $10^{-7}$ S and in particular is in the range from $10^{-7}$ to $10^4$, particularly preferably in the range from $10^{-3}$ to $10^2$, S/cm, and conductivity can be measured here to DIN EN 0303 Part 30.

The soft component can moreover comprise well-known additives, examples of which have been set out above.

The soft component can moreover comprise the abovementioned plastics whose modulus of elasticity is greater than 1000 MPa.

The bond strength of the composite product is at least 0.5 $N/mm^2$, preferably at least 1.0 $N/mm^2$. The bond strength can be obtained from stress-strain tests to ISO 527, the test velocity generally used being 50 mm/min at 23° C. For this, a test specimen is produced in which one shoulder area is composed of the hard component and the second shoulder area is composed of the soft component. Since the test specimen usually fails at the interface between the hard and the soft components, the bond strength corresponds to the tensile stress at break of the test specimen. The test specimens are preferably produced by injection molding, and details here can be found in the publication EP 1 128 955, in particular page 5, lines 34 to 58.

The bond strength can be achieved via well-known measures. By way of example, an adhesive layer modified for conductivity can be used.

However, in many cases it is possible to achieve adequate strength via careful selection of the hard components and of the soft components, without applying any adhesive layer. In order to achieve high adhesion, the region of the melting point of the soft component and of the hard component should be similar. Furthermore, the polarity of the two components should be similar. In order to improve adhesion, the soft component can be modified with a small amount of high-modulus-of-elasticity polymer of the hard phase. Furthermore, the hard component can also comprise a small amount of elastomer of the soft component.

Useful information is found inter alia in the patent literature, for example in DE 198 45 235, EP 1 128 955, and EP 1 225 036; and in brochures from producers of various plastics, e.g. "Technik Haftungsprüfung an Hard/Weichverbindungen" [Method for testing adhesion at hard/soft bonds] from PTS-Marketing & Vertriebs GmbH, 91587, Adelshofen and "Technology: Combimelt" from Engel AG.

It is therefore possible and preferable to combine soft components which encompass styrene elastomers (TPES) with hard components which comprise polypropylene. Given appropriate modification, which in any individual case is known to the person skilled in the art from the prior art, styrene elastomers can be connected to polyamides, polystyrenes, polyoxymethylene homo- and copolymers, polycarbonates, polybutylene terephthalates, and polyphenylene ether.

Soft components which comprise crosslinked and/or non-crosslinked polyolefin elastomers (TPEV; TPEO) are often suitable for combination with hard components which encompass polypropylene and/or which encompass polyamides, with necessary modifications if appropriate.

Polyurethane elastomers and/or polyester elastomers (TPEU; TPEE) are particularly suitable for combination with polyamides, acrylonitrile-butadiene-styrene copolymers (ABS), polyoxymethylene homo- and copolymers, polycarbonates (PC), and/or polybutylene terephthalates, in some cases with necessary modification of the elastomers and/or of the plastics of the hard component.

Polyamide elastomers (TPEA) can advantageously be connected to polyamides and/or polycarbonates.

According to one particular aspect of the present invention, the composite can have conductivity greater than or equal to 0.01 S/cm, preferably greater than or equal to 0.1 S/cm, particularly preferably greater than or equal to 1 S/cm, and conductivity here can be measured to DIN EN 0303 Part 30.

The composite preferably encompasses at least one surface whose surface conductivity is greater than or equal to $10^{-3}$ S, preferably greater than or equal to $10^{-2}$ S, particularly preferably greater than or equal to 0.1 S, and specific surface conductivity here can be measured to DIN EN 0303 Part 30.

According to one particular aspect of the present invention, at least one hard component and at least one soft component have been directly connected to one another. This connection can, inter alia, be achieved via thermoplastic shaping processes. Among these are coextrusion and specific injection-molding processes.

The composite is produced by well-known methods and processes, such as injection molding, injection-compression molding, extrusion, blow molding. Use of the multicomponent injection-molding process is economic and advantageous, and by way of example here the hard component is first molded, i.e. pre-injected, in the injection mold, and then a coating or a molding composed of the soft component is injected into the molding.

The melt temperature during manufacture of the hard components here is in the usual range, which depends on the particular plastics used. If polyacetals are used, this temperature is generally in the range from about 180 to 240° C., preferably from 190 to 230° C. The mold itself is preferably set at a temperature below the temperature of the molding composition. For polyacetals, the mold temperature is preferably in the range from 20 to 140° C. A mold temperature in the upper temperature range can be advantageous for precision of molding and dimensional stability of the hard component.

As soon as the cavity in the mold has been completely filled and the hold pressure is no longer effective (gate sealing point), the molding composed of the hard component can be subjected to final cooling and demolded as first portion of the composite (preform). A second, subsequent, separate injection-molding step then, by way of example, places or transfers this preform into another mold, whose cavity has a recess, and the soft component is injected into the mold and thus injected onto the preform. This process is known as the insert or transfer process. The particularly advantageous factor for the adhesion subsequently achievable is that the pre-injected molding of the hard component is preheated in order to facilitate incipient melting of the surface when the soft component is injected onto the material and to facilitate penetration of that component into the boundary layer. The temperature of the pre-injected molding here can be raised to just below the melting point, which can be determined to ISO 3146, Method C 1 b. If the hard component encompasses polyacetal, this temperature is preferably in the range from 80° C. to just below the melting point.

The injection-molded preform composed of the hard component can also be only partially demolded and moved into a further larger cavity together with a subcomponent of the original mold (e.g. the feed plate, the ejector side, or merely an index plate).

Another possibility consists in injecting the soft component into the same mold without intermediate opening of the machine and onward transport of the preform composed of the hard component. In this process, the mold cavities intended for the soft component are initially sealed during injection of the hard component via moveable inserts or cores and are not opened until the soft component is injected (slide technology). This variant of the process is also particularly advantageous for achieving good adhesion, since the melt of the soft component encounters a preform which is still hot after only a short cooling time.

If appropriate, further subcomponents composed of one or more hard components and/or soft components and/or of plastics having no conductivity can be injected onto the material simultaneously or in a sequence of subsequent steps.

When the soft components are injected onto the material, it is advantageous for good adhesion to select maximum settings for the melt temperature and for the injection pressure and hold pressure. The decomposition temperature provides the upper temperature limit here. In the case of styrene-olefin elastomers, the melt temperature is preferably in the range from 200 to 270° C., the upper limit being posed via decomposition of these materials. The values for injection rate and also for injection pressure and hold pressure are dependent on machine and on the molding and are to be adapted appropriately for the particular circumstances.

In all of the variants of the process, with or without demolding of the preform, the temperature of the mold can be controlled to a temperature in the range from 20° C. to 140° C. in the second step. As a function of the design of the subcomponents, it can be advisable to lower the mold temperature somewhat, in order to optimize deformability and cycle times. Once the subcomponents have been cooled, the composite molding is demolded. An important factor here in mold design is that the ejectors are attached at a site suitable for minimizing load on the joint between the materials of the composite. Adequate ventilation of the cavity in the region of the join is also to be provided in the design of the mold, in order to minimize any inhibition of the connection between the two components via included air. The nature of roughness of the wall of the mold also exerts a similar influence. A smooth surface at the site of the joint in the composite is advantageous for good adhesion, since less air is then included in the surface.

The soft component can be secured to the hard component via undercut (mechanical anchoring) or adhesive bonding. Incipient melting of the surface of component 1 (generally the hard component) by component 2 (generally the soft component) is particularly preferred, since, surprisingly, this can achieve particularly high conductivity of the composite.

Alongside the various injection processes, the processes of coextrusion and of co-blow mold are suitable for production of the claimed electrically conductive composites composed of at least one hard and one soft thermoplastic.

The composites of the present invention can in particular be used for production of casings or for subcomponents of casings in the electronics industry, in aircraft construction and in vehicle construction. Surprisingly, it has been found that these casings produce excellent shielding from electromagnetic waves, the casings here forming an effective closed shield or cage.

These composites can also be used to produce large-surface-area contacts which can be required for the earthing of, and the introduction of, high current intensities, for example those required for electromagnetic shielding, antistatic provision, and dissipation of surface charges, and production and contacting of resistance-heating elements.

In the sector of coextrusion and co-blow molding, the particular intended use is as any type of pipe (fuel lines) and cable sheathing with shielding properties.

Example 1

80 mm×120 mm×3 mm sheets composed of various steel-fiber-filled thermoplastics were injection-molded in a multi-daylight mold. The materials used are shown in Table 1. The sheets were then heated to 80° C. and placed in the same multi-daylight mold, but with thickness 4 mm, and overmolded with SEBS with Ni/graphite. This produced an SEBS layer of thickness 1 mm with Ni/graphite and very high conductivity at the surface, thus permitting contacting with very low contact resistance.

The resultant composite was tested for adhesion and electrical conductivity. To assess adhesion, the soft component was peeled in a peel test and the nature of the interface is assessed under a microscope. If adhesion is good, cohesive fracture occurs in the soft component, this being discernible in that residues of the soft component remain on the hard component. The adhesions determined are stated in Table 1. In the case of adhesive fracture, bond strength is above 0.5 N/mm².

TABLE 1

Adhesion of composite composed of an electrically conductive hard component and of an electrically conductive soft component

| Hard component | Proportion of glass fiber in % by weight[8] | Proportion of steel fiber in % by weight[8] | Soft component SEBS + PP Ni/graphite[6] | Soft component SEBS + PA Ni/graphite[7] |
| --- | --- | --- | --- | --- |
| POM[1] | 0 | 10 | ++ | + |
| PA66[2] | 28 | 10 | − | 0 |
| PBT[3] | 24 | 10 | − | 0 |

TABLE 1-continued

Adhesion of composite composed of an electrically conductive hard component and of an electrically conductive soft component

| Hard component | Proportion of glass fiber in % by weight[8] | Proportion of steel fiber in % by weight[8] | Soft component SEBS + PP Ni/graphite[6] | Soft component SEBS + PA Ni/graphite[7] |
| --- | --- | --- | --- | --- |
| PC[4] | 8 | 10 | + | + |
| PPO/PS[5] | 0 | 10 | + | − |

(++ cohesive fracture, + partial cohesive fracture, 0 adhesive fracture in boundary layer, − no adhesion).
[1] commercially obtainable from Ticona with trade mark Hostaform
[2] commercially obtainable from BASF with trade mark Ultramid
[3] commercially obtainable from Ticona with trade mark Celanex
[4] commercially obtainable from Bayer with trade mark Makrolon
[5] commercially obtainable from General Electric with trade mark Noryl
[6] commercially obtainable from Premix Oy with trade mark Preseal
[7] commercially obtainable from Premix Oy with trade mark Preseal
[8] steel fiber concentration was the product of blending (salt-and-pepper blends) from Celstran S (50% by weight of steel fibers) obtainable commercially from Ticona (20 parts by weight of Celstran S + 80 parts by weight of blend component). The stated glass fiber concentrations were obtained with use of glass-fiber-reinforced blend components.

To determine volume resistivity, plaques of dimensions 10 mm×10 mm were cut out and the surfaces were contacted with conductive silver paint. The resistance values measured for composites with good adhesion, about 0.5 ohm, give volume resistivity of about 1.3 ohms cm for the composite, using a cross-sectional area of 1 cm² and a thickness of 0.4 cm. This corresponds to conductivity of 0.8 S/cm.

Surface resistivity was measured to DIN EN 0303 Part 30. For the hard component it is from $10^2$ to $10^3$ ohms (surface conductivity from $10^{-2}$ to $10^{-3}$ S), and the surface resistivity of the soft component was determined analogously and is 0.1 ohm (surface conductivity 10 S).

TABLE 2

Elecrtical volume resistivity of composite composed of an electrically conductive hard component and of an electrically conductive soft component. (The molding has no undercut. Without adhesion it was impossible to produce a composite. For this reason no resistance has been stated.) The last column makes comparison with a superposed gasket.

| Polymer | Proportion of glass fiber in % by weight | Proportion of steel fiber in % by weight | Soft component SEBS + PP Ni/ graphite [ohm cm] | Soft component SEBS + PA Ni/ graphite [ohm cm] | Superposed soft component [ohm cm] |
| --- | --- | --- | --- | --- | --- |
| POM | 0 | 10 | 1.0⁺/−0.4 | 4.0⁺/−0.9 | 14 +/− 4 |
| PA66 | 28 | 10 | — | 47.9⁺/−8.4 | 2300 +/− 500 |
| PBT | 24 | 10 | — | 28.5⁺/−3.6 | 37 +/− 8 |
| PC | 8 | 10 | 11.9⁺/−2.3 | 11.0⁺/−2.3 | 25 +/− 9 |
| PPO/PS | 0 | 10 | 11.8⁺/−1.1 | — | 33 +/− 7 |

The examples presented show that composites with high bond strength have surprisingly low volume resistivity below 1 ohm*cm (conductivity above 1 S/cm). Comparison with superposed soft components makes the unexpected improvement clear (conductivity below 0.07 S/cm).

Example 2

The electrically conductive hard/soft composite was produced in a rotating mold for a 2-component tensile specimen. However, the first half of the tensile specimen was injection-molded from a steel-fiber-filled thermoplastic. The mold was then rotated and the second half of the tensile specimen composed of a thermoplastic elastomer was then injected flush onto the preform of the first half of the tensile specimen. To measure electrical resistance of the resultant composite, the ends of the tensile specimen were contacted with conductive silver paint and resistance was measured across the composite through the hard/soft interfaces (area 2 mm×5 mm), using an ohmmeter.

Electrical resistance of 10.5±1.9 ohms was measured for a composite composed of POM with 10% by weight of stainless steel fibers and SEBS with Ni/graphite. Based on the cross section used of 0.1 cm$^2$ and a length of 10 cm for a tensile specimen, the volume resistivity of the composite is about 0.1 ohm cm (conductivity greater than 10 S/cm).

Analogously, the volume resistivity was determined as 0.4 ohm for the composite composed of polycarbonate with 10% by weight of stainless steel fibers and 8% by weight of glass fibers and SEBS with Ni/graphite. As in Example 1, the poorer adhesion leads to higher resistance of the composite.

The invention claimed is:

1. A plastics composite, which comprises
   a) a hard component having a modulus of elasticity greater than or equal to 1000 MPa, wherein the hard component comprises a first conductive additive, the first conductive additive being selected from the group consisting of metals, metallized carbon, conductive plastics, and metallized fillers, the hard component further comprising a thermoplastic selected from the group consisting of polyacetal, polyamide, polyester, and combinations thereof, the first conductive additive comprising long conductive fibers having fiber lengths greater than 0.3 microns, the conductive additive being present in the hard component in an amount from about 5% to about 70% by weight and
   b) a soft component having a modulus of elasticity less than or equal to 500 MPa, wherein the soft component comprises a second conductive additive, the second conductive additive being selected from the group consisting of metals, metallized carbon, conductive plastics, and metallized fillers, the soft component further comprising a thermoplastic elastomer selected from the group consisting of polyolefin elastomers, polyetherester elastomers, polyesterester elastomers, polyether urethane elastomers, polyester urethane elastomers, polyetheramide elastomers, styrene elastomers, or combinations thereof,
   wherein the electrical conductivity of the composite is greater than 1 S/cm and the surface conductivity on at least one surface of the composite is greater than 0.1 S, and
   wherein the hard and the soft component have been connected to one another via an undercut or adhesion in such a way that the bond strength of the composite is at least 0.5 N/mm$^2$.

2. The composite as claimed in claim 1, wherein the first and second conductive additives independently comprise iron, steel, copper, brass, nickel, zinc, silver, gold, platinum, carbon, metallized carbon, metallized glass, or combinations thereof.

3. The composite as claimed in claim 1, wherein the second conductive additive is in the form of powder, beads, hollow beads, minerals and long or short fibers, or single-wall or multiwall nanotubes.

4. The composite as claimed in claim 1, wherein the hard and the soft component have been connected directly to one another.

5. The composite as claimed in claim 1, wherein the soft component comprises a blend which further comprises at least one polymer selected from the group consisting of polyolefins, polyacetals, polyamides, polyphenylene oxide, polyphenylene sulfides, polyphenylene ethers, polyurethanes, polycarbonates, polyesters, polystyrenes, acrylonitrile-butadiene-styrene copolymers, acrylonitrile-styrene-acrylate graft polymers, and liquid crystal polymers.

6. The composite as claimed in claim 1, wherein the soft component comprises a thermoplastic elastomer whose Shore hardness is from A 90 to D 30.

7. The composite as claimed in claim 1, wherein the soft component comprises a thermoplastic elastomer whose Shore hardness is from A 80 to A 60.

8. The composite as claimed in claim 1, which is composed of one or more soft components and one or more hard components.

9. The composite as claimed in claim 1, whose conductivity across the hard component/soft component interface is greater than 0.01 S.

10. A process for production of a composite as claimed in claim 1, which comprises molding the soft and/or the hard component via injection molding, injection-compression molding, coextrusion, or co-blow molding.

11. An electrical contact which comprises the composite as claimed in claim 1.

12. A gasket which comprises the composite as claimed in claim 1.

13. A casing in the sector of electrical or electronic equipment, telecommunications, information technology, motor vehicles, aircraft, or ships which comprises the composite as claimed in claim 1.

14. A casing for sensors, switching modules, control systems, plugs which comprises the composite as claimed in claim 1.

15. A pipeline for fuels, chemicals, liquids, powders and dusts with low electrical conductivity and/or low dielectric constant which comprises the composite as claimed in claim 1.

16. A resistance heating element which comprises the composite as claimed in claim 1.

17. An electromagnetic shielding in electrical cables which comprises the composite as claimed in claim 1.

18. The composite as claimed in claim 1, wherein the soft component further comprises a polyolefin.

19. The composite as claimed in claim 1, wherein the first conductive additive of the hard component, the second conductive additive of the soft component, or both comprise steel fibers.

20. The composite as claimed in claim 1, wherein the first conductive additive of the hard component differs from the second conductive additive of the soft component.

21. The composite as claimed in claim 1, wherein the first conductive additive of the hard component comprises steel fibers and the second conductive additive of the soft component comprises metallized carbon.

22. The composite as claimed in claim 1, wherein the thermoplastic of the hard component is selected from the group consisting of polyacetal, polyester, and combinations thereof.

23. The composite as claimed in claim 1, wherein the thermoplastic of the hard component is a polyacetal.

24. The composite as claimed in claim 23, wherein the hard and the soft component have been connected to one another via a direct adhesion.

25. The composite as claimed in claim 1, wherein the first conductive additive and the second conductive additive are the same.

* * * * *